UNITED STATES PATENT OFFICE.

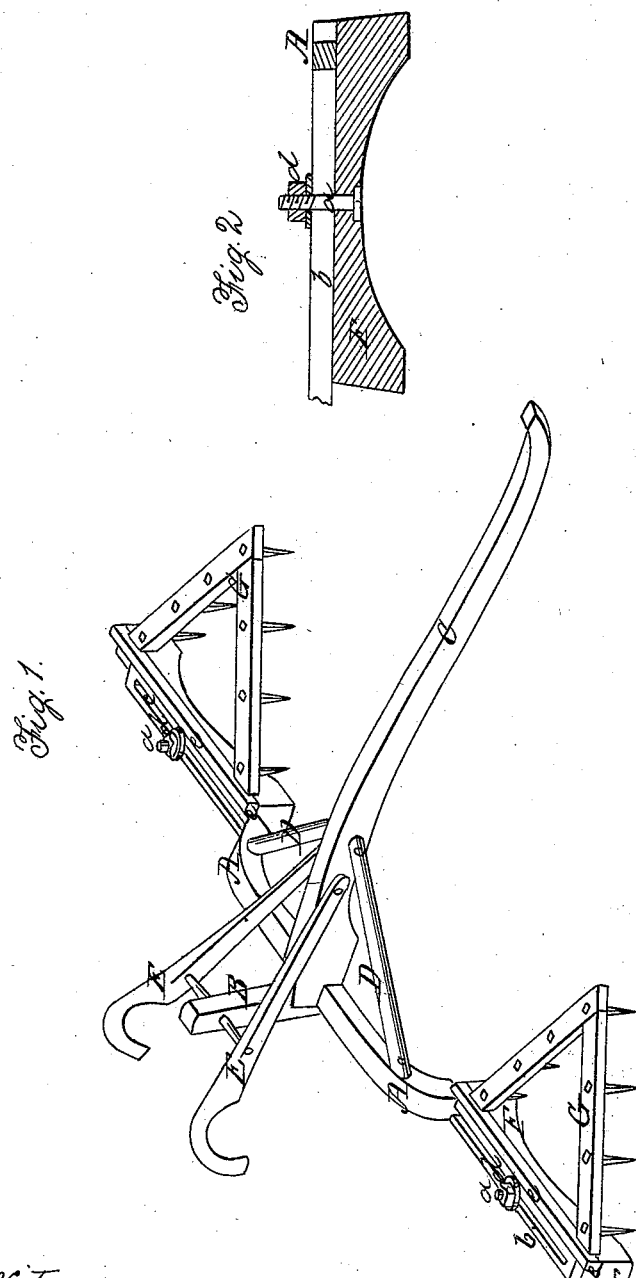

MATTHIAS D. MERIWETHER, OF DENMARK, TENNESSEE.

IMPROVEMENT IN HARROWS.

Specification forming part of Letters Patent No. 29,804, dated August 23, 1860.

*To all whom it may concern:*

Be it known that I, MATTHIAS D. MERIWETHER, of Denmark, in the county of Madison and State of Tennessee, have invented certain new and useful Improvements in Harrows for Covering Seeds Planted in Drills or Rows; and I do hereby declare that the following is a full, clear, and exact description of the construction and operation of the same, reference being had to the accompanying drawings, in which—

Figure 1 represents a perspective view of said harrow. Fig. 2 represents a longitudinal vertical section through the runner by which the harrows are supported.

My invention relates to the particular manner of connecting two or more harrows to one slotted and arched transverse beam, whereby the distance of said harrows from each other may be adjusted according to the different widths of the rows or drills the seeds of which are to be covered.

To enable others skilled in the art to make and use my invention, I will proceed to describe its construction and operation.

A represents a transverse arched beam, to which the standard B and tongue or beam C are secured in any known manner. The tongue C is braced to the beam A by means of the braces D, and the handles E are secured to the tongue C by bolts and rung, as shown, or otherwise.

F represents blocks to which the harrows G are secured. The harrows are made sufficiently wide to extend over the furrows which are to be covered, and they are secured to the slotted ends of the beam A by means of the bolts $a$, which pass through the block F and slots $b$ of the beams, and are secured to said beams by means of screw-nuts $d$, or otherwise. By loosening these screw-nuts the harrows can be spread or contracted to suit the width of the rows to be operated upon. This adjustment makes the machine a very useful one, as by it it is rendered available for covering all kinds of seeds which are planted in rows or drills.

The blocks F are hollowed out underneath, so as to round up the ridges behind the teeth, and on their top and front edges are placed ribs $e$, against which the slotted ends of the cross-piece A rest and move to make the harrows firm on said cross-piece. The arch in the center of the cross-piece A is to raise up the tongue and handles, and also to prevent any clods, &c., from striking against the cross-piece and raising it and the harrows from the ground.

The harrows may be taken off from the cross-piece and used separately for harrowing plowed ground; but when harrowing in seeds that are planted in rows—as, for instance, cotton seeds—they are adjusted on and connected to the cross-piece A, as shown.

Having thus fully described the nature of my invention, what I claim herein as new, and desire to secure by Letters Patent, is—

In combination with a slotted transverse arched beam, A, two or more adjustable harrows and harrow-blocks, when constructed and arranged substantially in the manner and for the purpose herein described.

MATT. D. MERIWETHER.

Witnesses:
E. COHEN,
I. HIRSCH.